United States Patent [19]

Waldrop

[11] 4,196,981
[45] Apr. 8, 1980

[54] EYEGLASSES HAVING MAGNETICALLY POSITIONED FLIP-UP LENSES

[76] Inventor: Jefferson P. Waldrop, P.O. Box 82, 496 High St. Ext., Thomaston, Conn. 06787

[21] Appl. No.: 917,684

[22] Filed: Jun. 21, 1978

[51] Int. Cl.² .................. G02C 9/02; G02C 7/08; G02C 5/22; A61F 9/00
[52] U.S. Cl. ........................................ 351/59; 351/57; 2/13; 351/153
[58] Field of Search .............. 351/47, 48, 57, 58, 351/59, 153; 2/13; 350/DIG. 3; 16/DIG. 14

[56] References Cited

U.S. PATENT DOCUMENTS

| 2,802,693 | 8/1957 | Lauve | 350/DIG. 3 |
| 2,986,970 | 6/1961 | Kilgour et al. | 351/41 |

FOREIGN PATENT DOCUMENTS 1037755  5/1953  France ..................... 351/59

Primary Examiner—John K. Corbin
Assistant Examiner—Rodney B. Bovernick

[57] ABSTRACT

These eyeglasses consist primarily of a frame, in the bridge portion of which, is a cylindrical magnet that is received within a sleeve of ferrous metal. The sleeve structure includes a flat connecting member, which is rigidly secured to a lens supporting member, so as to enable the wearer to pivot the lenses upward, or downward, as desired.

1 Claim, 2 Drawing Figures

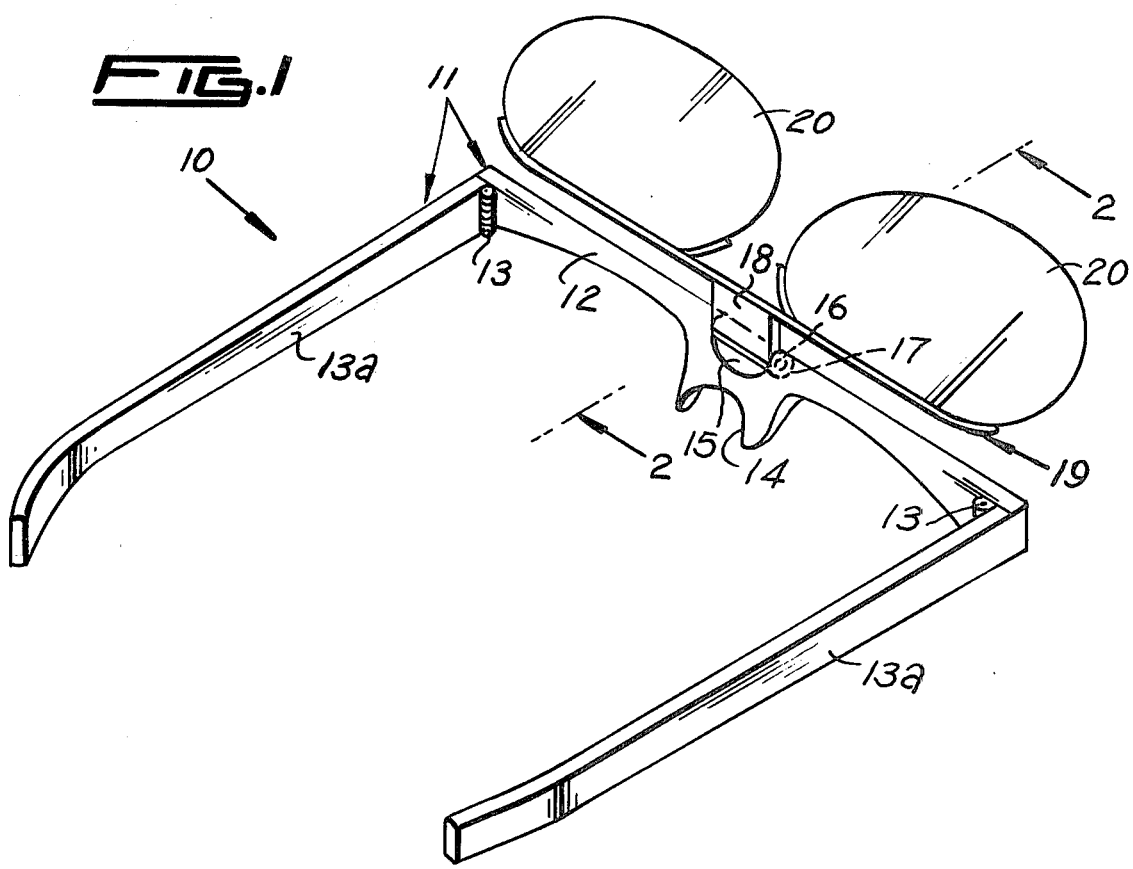
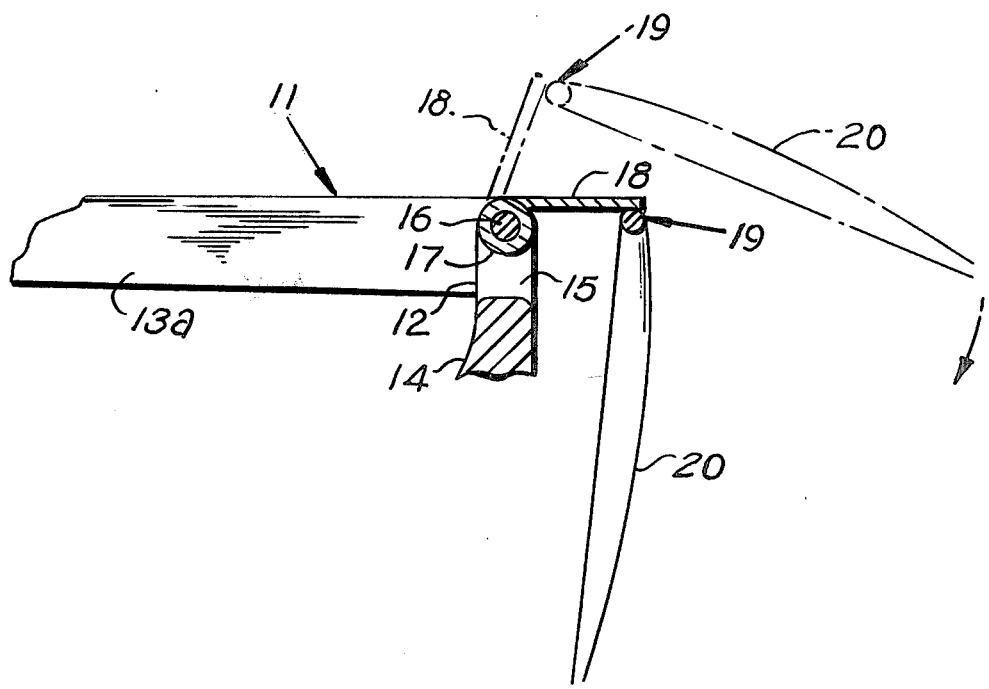

EYEGLASSES HAVING MAGNETICALLY POSITIONED FLIP-UP LENSES

This invention relates to the lens mounting means, and more particularly to eyeglasses and the like.

It is, therefore, the principle object of this invention to provide eyeglasses, which will have the lenses mounted pivotally to the frame, so as to enable the wearer to pivot the lenses upward or downward, as desired.

Another object of this invention is to provide eyeglasses, which will have the lenses mounted to a metal sleeve, which is rotatable on a permanent magnet of the assembly.

A further object of this invention is to provide eyeglasses, which will have the sleeve and magnet portions in the center of the assembly, so as to help prevent lens breakage if the eyeglasses are accidentally dropped, as there is created some resilience, because of the unique mounting of the lenses.

Other objects of this invention are to provide eyeglasses that are simple in design, inexpensive to manufacture, rugged in construction and easy to use.

These and other objects of the invention will become readily evident after a study of the following specification and the accompanying drawing, wherein:

FIG. 1 is a perspective view of eyeglasses comprising the present invention, and FIG. 2 is an enlarged cross-section view taken along the line 2—2 of FIG. 1, and it illustrates the upward position of the lenses in phantom.

According to this invention, eyeglasses 10 are shown to include a frame 11 made of suitable material known in the art. The main body 12 of frame 11, includes a hinge 13 secured at each end, which is secured to a temporal member 13a for retaining eyeglasses 10 on the wearers head. A bridge 14 is molded integral of main body 12, for a purpose, which hereinafter will be described.

A permanent magnet 16 of cylindrical configuration is secured fixedly at each end in a suitable manner, within opening 15, so as to be in alignment with the longitudinal upper portion of main body 12. A cylindrical sleeve 17 of ferrous metal, is rotatably received on the outer periphery of magnet 16, and by magnetic force, sleeve 17 is retained against rotation, until the user desires such. A connecting member 18 of rectangular and flat configuration, is fixedly secured at one longitudinal side edge, to the outer periphery of sleeve 17, and is in tangency therewith. The opposite edge is fixedly secured in a suitable manner to a lens mounting member 19, which is secured to a pair of spaced apart lenses 20. As seen more clearly in FIG. 2 of the drawing, the user may grasp the lenses 20 portions and raise or lower them when desired, and the lenses 20 will remain in place by magnetic force upon the sleeve 17.

It shall be noted, that the sleeve 17, its connecting member 28, and the lens mounting member 19, may be fabricated as a one piece structure if desired.

While various changes may be made in the detail construction, it is understood that such changes will be within the spirit and scope of the present invention, as is defined by the appended claims.

What I now claim is:

1. Eyeglasses comprising a frame having a bridge for supporting a lens mounting member which is pivotal of the main body of said frame, a cylindrical permanent magnet secured in an opening in the center of the top of said main body, the ends of said cylindrical permanent magnet being fixedly secured to the ends of said opening, said cylindrical permanent magnet being aligned with the longitudinal length of said main body and positioned above the bridge of said body, a ferrous metal sleeve disposed on said cylindrical magnet, with said lens mounting member being attached to said sleeve, said ferrous metal sleeve being rotatable on said permanent magnet such that the magnetic force between said magnet and said sleeve will hold said lens mounting member stationary in a raised or lowered position.

* * * * *